United States Patent [19]

Hyer et al.

[11] Patent Number: 4,762,252

[45] Date of Patent: Aug. 9, 1988

[54] ADAPTATION TO MAJOR OR SPORADIC DISTURBANCE ERROR IN WEIGH FEEDING APPARATUS

[75] Inventors: Frank S. Hyer, Duxbury; Paul M. Kintner, Pembroke, both of Mass.

[73] Assignee: Hyer Industries, Inc., Pembroke, Mass.

[21] Appl. No.: 47,260

[22] Filed: May 8, 1987

[51] Int. Cl.$^4$ .......................................... G01G 13/285
[52] U.S. Cl. ........................................ 222/56; 222/58; 222/63; 222/77; 177/50
[58] Field of Search ........................ 222/58, 55, 52, 56, 222/63, 77; 177/50

[56] References Cited

U.S. PATENT DOCUMENTS

| Re. 32,102 | 4/1986 | Ricciardi et al. | 222/56 |
|---|---|---|---|
| 3,498,395 | 3/1970 | Henry et al. | 177/1 |
| 3,905,874 | 9/1975 | Griffin et al. | 203/1 |
| 4,635,819 | 1/1987 | Wilson et al. | 222/58 |

OTHER PUBLICATIONS

"Limit Cycles and Expanding Cycles" Article from Foxboro Control Notebook, Nov. 1974.
Steward, "Rate Limiting in Incremental Computers", Proceedings of the Computers in Control Systems Conference, Oct. 16, 1957.

Primary Examiner—H. Grant Skaggs
Assistant Examiner—Stephen Parker
Attorney, Agent, or Firm—James & Franklin

[57] ABSTRACT

When a weigh feeding system which senses the rate of material feed by weighing the material and automatically controls the actual feed on the basis of a departure of the sensed rate of material feed from a desired rate, thereby to produce an error signal, is subjected to a major or sporadic disturbance such that the sensed rate departs from the desired feed rate by more than a predetermined amount, the system limits the feed rate used to produce the error signal to a synthetic amount no matter by how far the sensed feed rate departs from the desired rate, the values of said predetermined amount and said synthetic amount being selected in accordance with the nature of the system, the degree of accuracy desired, and the nature of the expected disturbances, thereby to improve the overall accuracy of the system when subjected to such disturbances.

17 Claims, 3 Drawing Sheets

ADAPTATION TO MAJOR OR SPORADIC DISTURBANCE ERROR IN WEIGH FEEDING APPARATUS

The present invention relates to a loss-of-weight type weigh feeding system that controls the rate of material feed in response to an evaluated error term which at times is based on the difference between the set point and a true rate measurement and at other times is based on the difference between the set point and a substituted synthetic value. Under normal operating environments, in the absence of disturbances other than normal background disturbance, the system is set up so that a very high percentage of the error terms will be based on true weight measurements (95% typical), and only a small percentage of the error terms will be based on synthetic values, each class occurring more or less randomly over time. The percentage of true measurements decreases in relation to the severity of a superimposed disturbance, while the percentage of synthetic values increases by a corresponding amount, the proportion being self adjusting to the severity of the disturbance. The net result is a feeding system that weighs very accurately during normal, undisturbed periods of operation, and which, while under the effects of higher levels of disturbance, shows a great immunity to the error effects that would be introduced otherwise, all the while maintaining a high degree of sensitivity to any changes in bulk density that may occur in the material at a time the additional disturbance is prevalent.

Weigh feeding systems which function by sensing the weight of the unfed material and controlling the rate of material delivery in accordance with the rate at which the weight of the unfed decreases have long been known. Turner U.S. Pat. No. 3,099,368 of July 30, 1963 entitled "Dispensing Apparatus Having Loss of Weight Hopper", and Marhauer U.S. Pat. No. 3,481,509 of Dec. 2, 1969 entitled "Mass Flow Controller" are typical of such systems, and the Marhauer patent is an early representative of the modern electronic approach to control systems used in that connection. More recently microprocessors have taken over some of the electronic computations involved, as is shown, for example, in Ricciardi et al. U.S. Pat. No. 4,320,855 of Mar. 23, 1982 entitled "Weigh Feeding Apparatus". In weigh feeding systems of the general type under discussion the material to be fed, usually contained in a hopper, is either continuously or intermittently sensed by weighing as the system delivers material, the weight is converted into an electrical signal, and that signal is utilized to produce a second signal indicative of the sensed rate at which the weight of the material in the hopper is decreasing, this normally corresponding to the rate at which the material is actually being delivered. That sensed rate signal is compared with another signal representative of the desired rate of material supply to produce an error signal, and the mechanism which is causing the material to be delivered, such as a feed motor, has its speed varied in accordance with that error signal, thereby to maintain material delivery at the desired rate with a reasonable degree of accuracy. Preferably the change effected in the speed of the delivery motor based on the error signal is a complex function of that signal, usually constituted by the sum of the error and an integral of the error with respect to time.

Such systems are known to operate with a high degree of accuracy under normal operating conditions. However, experience has shown that in practice such systems are often subjected to a variety of relatively major or sporadic external disturbances which because of their nature and/or magnitude so adversely affect a normally operating system, by causing the sensed weight of material to depart from its actual weight (thus making the system think that the rate of material delivery is other than what it actually is), as to give rise to unacceptable feed rate errors. There are many different types of events which constitute such disturbances—human intervention, such as bumping into the scale or dropping a weighted object such as a lunch bucket on the scale, or environmental irregularities such as pneumatic dust collection systems, vibratory bin activators, ventilation fans, scale mounted vibrators, material spillage onto and off from weighed parts of the system, and even, under some circumstances, wind.

Among the suggestions that have been made in the past in an effort to ameliorate the adverse effects of such disturbances, Ricciardi et al. U.S. Pat. Nos. 3,889,848 of June 17, 1975 entitled "Automatically Controlled Weigh Feeding Apparatus" and Reissue Pat. Nos. 32,101 and 32,102 of Apr. 1, 1986 entitled "Weigh Feeding Apparatus" propose that when there is an excessive deviation between successive rate signals (i.e., excessive acceleration of the weight signal) the control system should in effect be ignored and the actuation of the feeding means be maintained unchanged until said deviation returns to its normal range.

Such disturbance-compensating systems are effective under more or less ideal conditions, but they are susceptible to the possibility of long periods when the normal control system is inoperative, particularly where the external disturbance is of appreciable duration or magnitude. In such case, to avoid long periods of control lockout the range over which the system will operate normally must be made quite large, but in so doing the effectiveness of the system to protect against sporadic shocks, such as those resulting from occasional human contact, is compromised. In addition, in such systems if the desired rate of material delivery is changed at a time when, because of a detected major disturbance, the system is not functioning normally serious inaccuracy can develop at the new operating rate.

It is the prime object of the present invention to modify the operation of a weigh feeding system during the time that the system is affected by a major or sporadic disturbance so as to eliminate the above drawbacks and to provide a higher degree of system accuracy than has heretofore been attained.

To that end, in the system of the present invention, when, because of the existence of a major or sporadic disturbance, the signal representing sensed rate of material delivery departs from the signal representing desired rate of material delivery (set point) by more than a predetermined amount in one direction or the other, the system will continue to exercise its automatic control function, but only on the basis of a synthetic rate signal of a magnitude predetermined either empirically or on the basis of theoretical analysis, that synthetic rate signal remaining operative for so long as the sensed rate signal exceeds the predetermined limit. In contradistinction to the systems above described where, when the difference in successive rate signals exceeds a predetermined limit, the automatic control system is rendered inoperative and the actuation of the material feeding means remains constant, in accordance with the present invention when the sensed rate signal exceeds a limit, the synthetic rate signal becomes operative, it is that synthetic rate signal which, is compared with the set point (desired rate) signal, an error signal is still produced, and the actuation of the material feeding means is still modified in accordance with that error signal. Because of this fundamental difference between the two systems the system of the present invention provides a higher degree of sensitivity and accuracy when subjected to major or sporadic disturbances of the type likely to be experienced in practice.

Moreover, the system of the present invention, because it continues to function as a control system even when subjected to the major or sporadic disturbance, can be tailored to respond most sensitively and accurately to the different types of major disturbance to which it will be subjected in a given installation. For example, in one plant the system may be located near an intermittent vibratory source of one characteristic and in another plant may be located near an intermittent vibratory source of another characteristic, whether of intensity, frequency, duration, intermittency, or the like. The effect of the external disturbance may also be symmetric or non-symmetric—it may cause the error produced in the weigh feeding system to be equal in both directions or greater in one direction than in the other over a period of time. All of these factors can, in a system of the present invention, be taken into account by a suitable selection of the parameters by which the values of the synthetic rate signals are determined. The synthetic values may be the same as or different from the limit values which caused the synthetic values to become operative, the upper and lower limit values may be the same or different, the upper and lower synthetic values may be the same or different, and the magnitudes of all those parameters can be differently selected, in order to best resolve the problems that a given system faces in terms of its environment and the conditions to which it is subjected.

To the accomplishment of the above, and to such other objects as may hereinafter appear, the present invention relates to a weigh feeding system having means to improve accuracy in the event of major or sporadic disturbances active thereon, as defined in the appended claims and as described in this specification, taken together with the accompanying drawings in which:

Figure 5:
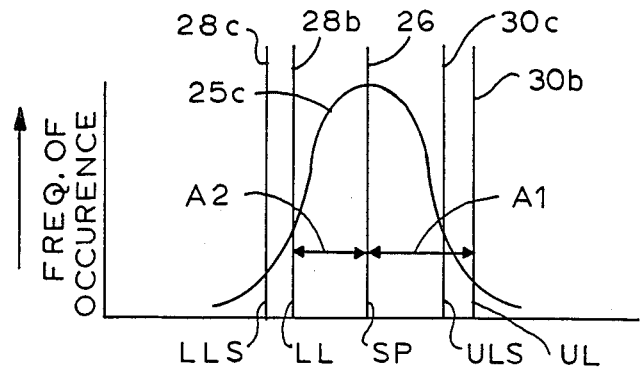
FIG. 5 is a distribution curve similar to that of FIG. 3 and showing a generalized indication of the various signal values utilized in the present invention.
Figure 6:
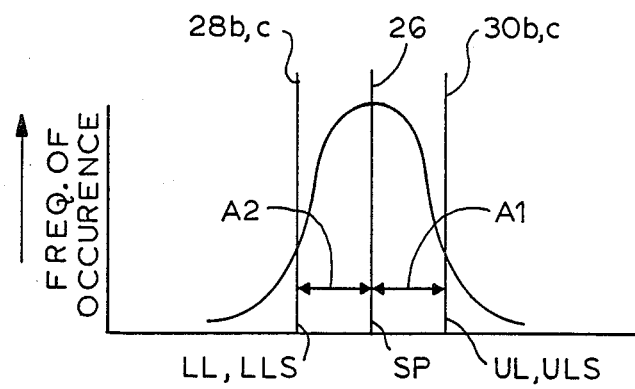
FIG. 6 is a view similar to FIG. 5 but in which the synthetic upper and lower signals are the same as the upper and lower limit signals, with each displaced equally from the set point.
Figure 7:
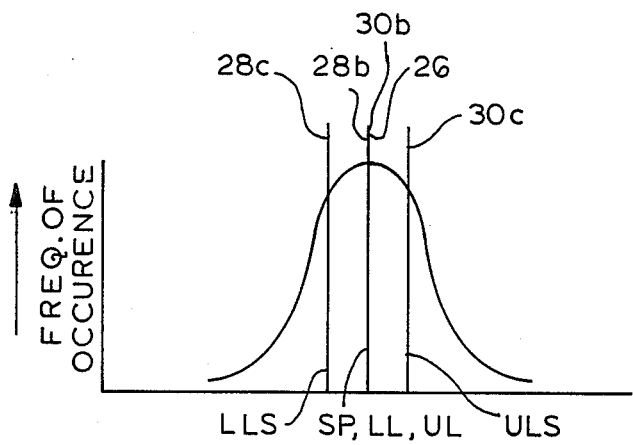
Figure 8:
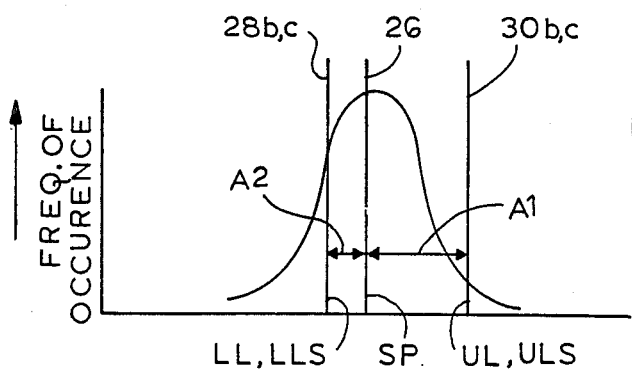

FIG. 7 is a view similar to FIG. 5 illustrating a special case in which any departure from the set point brings the system of the present invention into operation, the upper and lower limits being essentially the same as the set point; and FIG. 8 is a view similar to FIG. 6 illustrative of the manner in which the present invention can be used in an environment where the distribution curve of rate signals is highly non-symmetrical.

Figure 1:
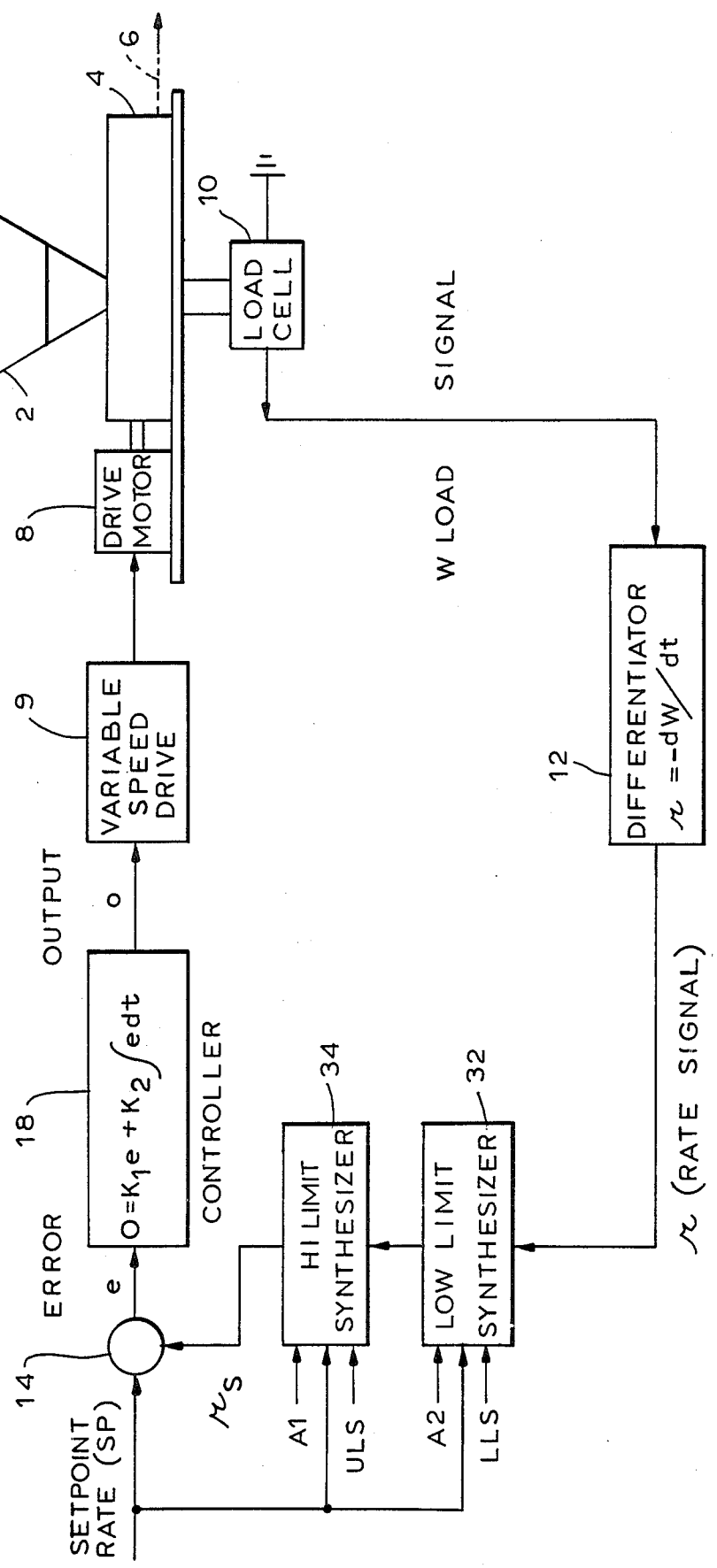
FIG. 1 is a block diagram of a typical system of the present invention.

A typical weigh-feeding system, modified in accordance with the present invention, is disclosed in FIG. 1 in block diagram form. The material to be fed is stored in a hopper 2 from which the material flows to a delivery mechanism 4 of any appropriate type, such as an auger or vibrating trough, with the material being dispensed therefrom being indicated by the arrow 6. The delivery mechanism 4 is driven by a suitable motor 8, the speed of which is controlled by a variable speed drive 9. The entire complex of hopper 2 and drive motor 8, together with the material being delivered, may be weighed together by load cell 10, the electrical output of which, a signal (w), represents the weight sensed by the load cell 10. That signal w is fed to a differentiator 12, the output of which, a signal (r), represents the negative of the rate of change of the sensed load with respect to time and thus represents, under ideal conditions, the rate at which the material 6 is being dispensed. That signal r is fed to a comparison means 14 where it is compared with a signal (SP) (set point), which is either manually or automatically set and represents the desired material delivery rate. The comparison means 14 senses any difference between r and SP and produces an error signal (e) representing that difference. That error signal e is used to control the variable speed drive 9 which in turn controls the speed of the drive motor 8. It is generally preferred that the error signal e be fed to a controller circuit 18 the output (o) of which, used to control the variable speed drive 9, represents a complex function of e, usually consisting of the sum of a first quantity proportional to e and a second quantity proportional to the integral of e with respect to time.

Figure 2:
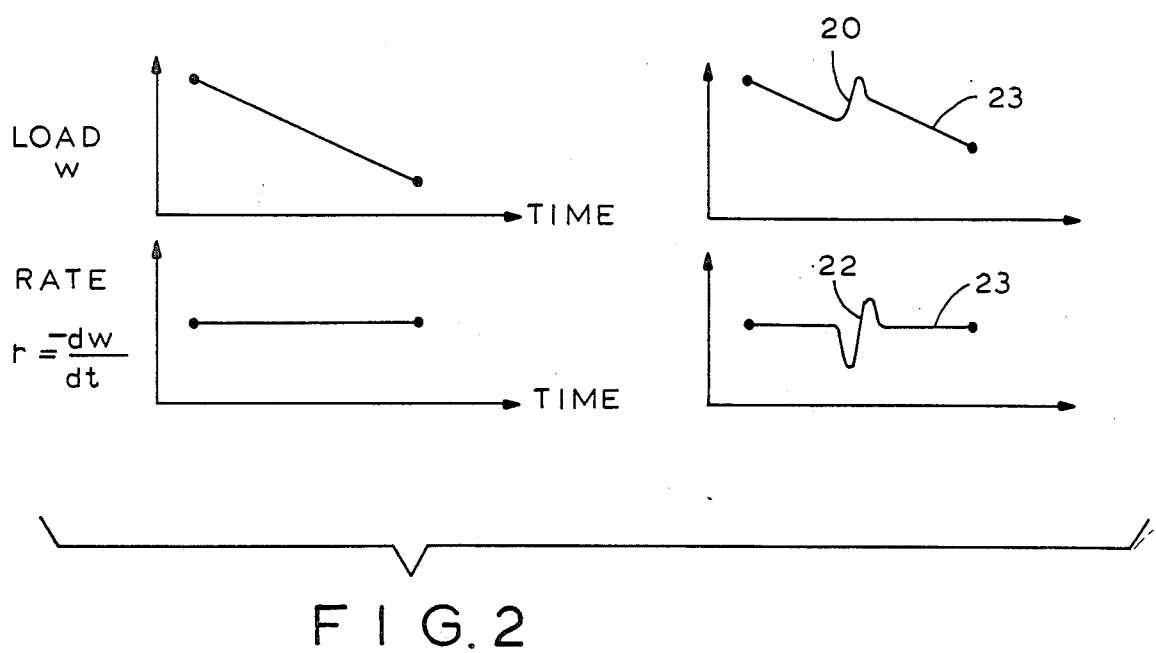
FIG. 2 is a graphical representation of the relationships between the weight signal and the signal representing rate of weight decrease, first under normal conditions and then when the system is subjected to a disturbance in the form of an incremental weight addition.

The upper graph on the left-hand side of FIG. 2 is a plot of the load signal w with respect to time during normal operation and assuming a constant rate of material delivery, reflected in the uniform slope of the plot. The graph thereunder represents the rate signal r, which is constant.

The right-hand series of graphs in FIG. 2 illustrates what can happen to the system when it is subjected to an extraneous disturbance, in this instance, for purpose of illustration, a momentary disturbance caused by a workman dropping his lunch box on the scale. This causes an immediate jump 20 followed by a series of oscillations in the load signal w, because the load cell 10 is now weighing the lunch box in addition to the elements 2, 4 and 8 and the material being fed. However, the dropping of the lunch box on the scale has a momentary effect, and thereafter material is fed at its usual rate (plot lines 23). Consequently the rate signal r has but a temporary disturbance 22, consisting of a brief series of oscillations.

Figure 3:
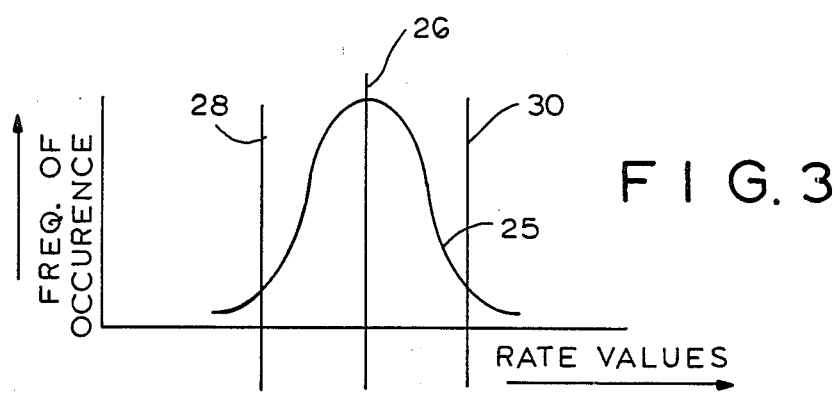
FIG. 3 is a typical frequency distribution curve of the rate signals during "undisturbed" operation of the system.

Other types of external disturbance will have their own typical effects on the load signal w and the rate signal r. Some of them are inescapably and normally present in the real world. There is always a certain amount of background disturbance superimposed on the load signal w. This comes from such things as rotating mechanical parts, inconsistency in the delivery rate of material, air currents, and relatively uniform vibration from other equipment. If one were to sample the rate signal r while a typical given system was operating in a normal real world environment such as has been described, a distribution curve of those sampled rate signals r on the abscissa against the frequency of occurrence of a given rate r on the ordinate could be essentially as shown in FIG. 3, taking the shape of a conventional bell-shaped distribution curve 25. The line 26 represents the mean value of r (the arithmetic average of all of the signals). Because of the integral term in the function of the controller 18, the line 26 would coincide with the SP signal. If the distribution curve were symmetrical, line 26 would represent both the mean and the median (the flow rate value that has just as many values higher than itself as lower than itself). The median and the mean would not coincide if the distribution curve were unsymmetrical. The lines 28 and 30 represent the limits of the values of r between which a predetermined percentage of all of the r values fall. Mathematically this is generally referred to in terms of "standard deviations". If plus and minus two standard deviations are involved, for example, approximately 95% of the measured values of r fall between the lines 28 and 30.

Figure 4:
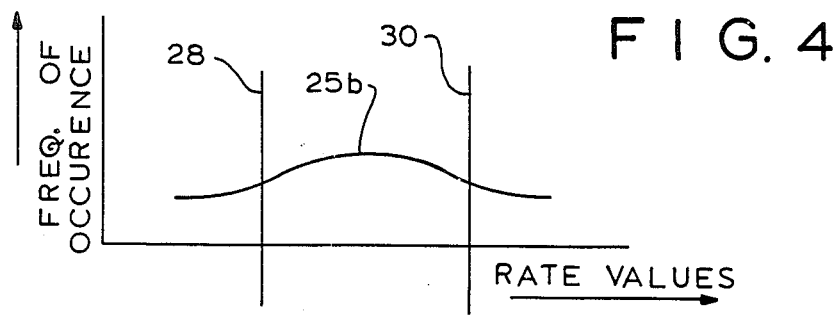
FIG. 4 is a typical frequency distribution curve of the rate signals during "disturbed" operation of the system.

FIG. 4 is another distribution curve 25b for the signal r in a situation where the system is subjected to disturbances of higher level than those applicable to FIG. 3. Under those circumstances, as will be seen from the distribution curve, many more of the r signals are to be found outside the lines 28 and 30 than was the case in the situation reflected by FIG. 3. It is characteristic of major or sporadic disturbances (not merely normal background noise) that a high percentage of the rate signals r generated while the system is being affected by those disturbances will fall outside of that signal leven zone (between the lines 28 and 30) that contained most of the r signals during disturbance-free conditions. The proportion of r signals falling outside of the 28–30 zone has been found to increase dramatically, sometimes accounting for the majority of such signals. While the magnitude of these excursions beyond the 28–30 zone are not in all, or even most, cases equal in the positive and negative directions relative to the line 26, the amount of time that the signal falls above the zone 28–30 is generally about equal to the amount of time it falls below the zone, for many of the types of disturbances normally encountered.

From this it follows that if control is based on an approximate zone 28–30 the system would show high immunity to abnormal disturbances and yet still maintain the feature of gravimetric control under those conditions. To that end, and as disclosed diagrammatically in FIG. 1, there is interposed between the differentiator 12 and the comparison means 14 a low limit synthesizer 32 and a high limit synthesizer 34 for the rate signal r, each individually set and each comparing its setting with the signal r emanating from the differentiator 12. The low limit synthesizer will pass the signal r unchanged so long as the signal r is equal to or greater than the value to which the low limit is set, but if r is less than the low limit value unit 32 will pass a predetermined synthetic r signal which may or may not be equal to thät set value. Correspondingly, the high limit synthesizer will pass a signal r that is equal to or less than the limit value to which it is set, but if the signal r is greater than that set value it will pass a predetermined synthetic signal r which may or may not be equal to that set value, the output from the two limit synthesizers 32 and 34 being designated $r_s$ in FIG. 1 (possibly modified or synthetic r). It will be appreciated from the above, however, that $r_s$ will equal r whenever r is within the limits to which the units 32 and 34 have been set, and will equal the appropriate synthetic values if r falls outside the limits to which the corresponding units 32 and 34 have been set.

This goal is achieved by selecting limit values for r in both directions which are appropriate to the particular installation involved, the magnitude of the synthetic values being selected so as to provide appropriate loop gains compatible with the particular setup. This is illustrated graphically in a generalized fashion in FIG. 5, where the curve 25c represents an idealized distribution of the frequency of r values and line 26 represents the set point SP. Since external disturbances may be non-symmetrical, causing a departure from normal in one direction more than in the other direction, that situation is reflected in FIG. 5, where lines 28b and 30b represent the plus and minus two-sigma range corresponding to including about 95% of the signals within its scope when the system is operating normally in the absence of disturbances. The values corresponding to lines 28b and 30b (LL and UL) represent the detection set points for the low limit synthesizer 32 and high limit synthesizer 34 respectively. In the general case the synthetic r values used in the system when the measured r falls outside the prescribed limits need not be the r's of those prescribed limits, but can be, and often may preferably be, some other value (LLS and ULS respectively). Hence in FIG. 5, by way of illustration, the line 30c (ULS) represents the value of r used for $r_s$ when the high limit of 30b is exceeded and the line 28c (LLS) represents the $r_s$ that is used when the sensed value of r is less than the value represented by the low limit line 28b. The departures of the lines 28c and 30c from the lines 28b and 30b can be in either direction, and to any desired value, depending upon the parameters which make for the best end result.

FIG. 6 represents a less generalized situation than FIG. 5, in which the lines 28b and 28c coincide and the lines 30b and 30c coincide, the $r_s$ values used when the limits are exceeded (LLS and ULS) thus equaling the limit values LL and UL themselves.

FIG. 7 illustrates a special case, where the lines 28b and 30b both substantially coincide with the set point 26. Thus any departures of r in an upper direction from 26 will give rise to an $r_s$ signal represented by line 30c (ULS), and departure of r in the lower direction will give rise to an $r_s$ represented by line 28c (LLS). The values of 28c (LLS) and 30c (ULS) will be appropriately chosen to produce adequate loop gains and will be displaced unequally about the SP by an amount necessary to compensate for non-symmetry of the frequency distribution if such non-symmetry exists, as is usually the case. This approach provides the greatest immunity to disturbance effects but measurement accuracy usually deteriorates.

In general, the selection of appropriate limiting values for the lines 28 and 30 represents a compromise between accuracy under normal operation and accuracy under extreme external disturbances. For normal operation selection of values for the lines 28 and 30 corresponding to plus or minus one sigma or standard deviation will result in errors of less than 1%, separating the lines 28 and 30 by plus or minus 2 sigma produces a typical error of one part in 2,000 and separating them by plus or minus 3 sigma causes no observable error effect, but the greater the separation between the lines 28 and 30, the greater will be the adverse effect of serious external disturbances, especially when they are non-recurring or produce non-symmetrical effects. Purely by way of example, if the set point is 50 pounds per hour, this corresponding to line 26, a plus or minus 2 sigma separation of the lines 28 and 30 would give them the values of 38 and 62 pounds per hour respectively.

FIG. 8 represents a situation similar to FIG. 6 but in which the limit lines $28b,c$ and $30b,c$ are differently spaced from the set point 26, as was the case in the generalized situation of FIG. 5, differing from FIG. 5, however, in that the $r_s$ values equal the limit values.

The actual values to be employed in any given installation can be determined to a large extent empirically. For example, one can start with the symmetrical system of FIG. 6, which in many instances provides the greatest immunity to disturbance effects, but if the disturbance effects are not symmetrical measurement accuracy will deteriorate. That accuracy can be improved by applying a biasing coefficient to the limit values in determining $r_s$, as is shown by the differences between the lines $28c$ and $30c$ and the lines $28b$ and $30b$ respectively in FIG. 5 and/or by changing the limit values and/or by making the limit values non-symmetrical about a central measuring point.

The arrangements of FIGS. 5, 6 and 8 may be considered as a three-zone system, one zone being between the limits and the other two zones being outside the limits, whereas the arrangement of FIG. 7 may be considered a two-zone system in which all r values except precisely at the set point fall into one zone or the other.

Expressed symbolically, in the system of FIG. 5:
$UL = SP + A1$
$LL = SP - A2$
If $LL < r < UL$, then $r_s = r$
If $r > UL$, then $r_s = ULS$
If $r < LL$, then $r_s = LLS$
$ULS = UL \times C$
$LLS = UL \times D$,
where C and D may or may not be 1, and may or may not be equal to one another.

In a typical FIG. 5 system $A1 = A2 = 2$ sigma distribution (thus making it a FIG. 6 system), $LLS = LL$, $ULS = UL$. For a 100 pounds per hour system, SP may be any value from 5 pph to 100 pph, and $A1 = A2 = 10$ pph = 2 sigma.

In a typical FIG. 7 system:
$A1 = A2 = 0$
$LL = SP(-)$
$UL = SP(+)$
$ULS = SP + 10$
$LLS = SP - 10$ Arbitrary biasing may be employed. For example, if after running a system experience shows an offset error of 2%, this can be compensated for by applying a biasing factor E of, say, 0.098 or 1.02, depending upon the direction of the error, applied either to the ULS and LLS values or to r, depending upon the compensation problems actually experienced.

By employing the thus described system for accommodating the effects of extreme or sporadic external disturbances it will be appreciated that the system is always functioning in its gravimetric control mode and whenever the rate r departs from the set point it is always exerting a control effect tending to change the speed of the drive motor so as to bring r back to the set point. This is to be contrasted, for example, with those systems where, when a disturbance is detected, the gravimetric control system is in effect shortcircuited. Not only is the present system, because it is always controlling in response to gravimetrical factors, more accurate, but because its mode of control can be readily tailored to the particular problems presented in a given installation the degree of improvement in accuracy is significant.

While but a limited number of embodiments of the present invention have been here disclosed, it will be apparent that many variations can be made therein, all within the scope of the invention as defined in the following claims.

We claim:

1. In a weigh-feeding system comprising controllable means for feeding material to a delivery point, means for weighing said material in advance of said delivery point, means for sensing the rate of change of said weight, means for establishing a desired rate of change of weight corresponding to a desired material delivery rate, means for making a comparison between said sensed rate and said desired rate and means for normally controlling said feeding means in response to said comparison in order to produce a controlled feed of material at said desired material delivery rate, the improvement which comprises means for substituting for said sensed rate a pre-established synthetic rate differing from said desired rate by a predetermined amount whenever said sensed rate reaches or exceeds a limit value deviating from said desired rate in an increasing or decreasing sense, and controlling said feeding means in response to a comparison between said desired rate and said synthetic rate.

2. The weigh-feeding system of claim 1, in which a pair of synthetic rates of change of weight are established, each in an opposite sense from said desired rate.

3. The weigh-feeding system of either of claims 1 or 2, in which for at least one sense the corresponding synthetic rate equals the corresponding limit value.

4. The weigh-feeding system of either of claims 1 or 2, in which for at least one sense the corresponding synthetic rate has a value equal to the corresponding limit value multiplied by a number other than one.

5. The weigh-feeding system of either of claims 1 or 2, in which for at least one sense the corresponding synthetic rate has a value equal to the corresponding limit value multiplied by a number greater than one.

6. The weigh-feeding system of either of claims 1 or 2, in which for at least one sense the corresponding synthetic rate has a value equal to the corresponding limit value multiplied by a number less than one.

7. The weigh-feeding system of claim 2, in which the displacement of each of said limit values from said desired rate is a different amount.

8. The weigh-feeding system of claim 2, in which the synthetic rates corresponding respectively to each of said limit values are displaced from said desired rate by different amounts.

9. The weigh-feeding system of either of claims 1 or 2, in which for at least one sense the corresponding limit value differs in said given direction from said desired rate by an amount such as to include between itself and said desired rate about 95% or less of said actual rate values in the corresponding given sense under normal undisturbed operating conditions.

10. A weigh-feeding system comprising a container for a substance, discharge means for discharging the substance from the container at a controllable feed-out rate, means for producing a first signal corresponding to the desired feed-out rate, means for sensing the weight of at least the substance in the container and for producing a second signal corresponding to said weight, means for computing a sensed feed-out rate from said second signal and producing a third signal corresponding thereto, means for producing fourth and fifth signals representative of high and low tolerance limits on said third signal, means for rendering said third signal operative when said third signal is within said tolerance limits and for rendering either said fourth or fifth signal operative if said third signal departs from, said tolerance limits, depending on the sense of said departure, control means responsive to the difference between said first signal and the operative one of said third, fourth or fifth signals, said control means controlling said discharge means to thereby maintain the feed-out of the substance from the container at the desired feed-out rate and to improve accuracy in the event of major disturbances active on said system.

11. Apparatus for controlling the rate of flow of a bulk material from a weighed container having a flow control means at its discharge, said apparatus comprising:

(a) means for producing a weight signal representative of the weight of at least the material in said container;

(b) means for converting said weight signal into a sensed flow rate signal representative of the time rate of change of said weight signal;

(c) means for establishing a set point signal representative of the desired time rate of change of weight;

(d) means for establishing signals representative of high and low limits respectively displaced in opposite senses from said set point for said time rate of change of weight;

(e) means for producing a controlling flow rate signal by using the sensed flow rate signal when the sensed flow rate lies within said high and low limits and by using a synthetic signal representative of either said high or low limit when the sensed flow rate falls outside that limit;

(f) control means connected to receive both the set point signal and the controlling flow rate signal, said control means producing a correction signal representative of the difference between the controlling flow rate signal and the set point signal; and (g) means responsive to said correction signal to adjust said flow control means to provide the desired flow rate and to improve accuracy in the event of major disturbances active on said system.

12. A system for controlling the flow of a fluid material comprising a reservoir for said material, said reservoir including a discharge port, means for controlling the rate of flow of said material through said discharge port in response to an applied discharge control signal, means for generating a weight signal representative of the weight of said material in said reservoir, means for generating a set point signal representative of a desired flow rate of material from said reservoir, means for generating from said weight signal a sensed flow rate signal normally representative of the actual flow rate of material through said discharge port, means for detecting whether said sensed flow rate signal is greater than an upper limit substantially equal to said set point plus a predetermined constant A1, where A1 can be zero, or less than a lower limit substantially equal to said set point minus a predetermined constant A2, where A2 can be zero, means for generating a synthetic upper limit flow rate signal, means for generating a synthetic lower limit flow rate signal, means for generating a controlling flow rate signal representative of:

(i) said sensed flow rate signal when said sensed flow rate signal lies between said upper and lower limits, (ii) said synthetic upper limit signal when said sensed flow rate signal is above said upper limit, and (iii) said synthetic lower limit signal when said sensed flow rate is below said lower limit, means to develop a flow rate error signal representative of the difference between said set point and said controlling flow rate signal, and control means responsive to said flow rate error signal to produce said discharge control signal and thus effective to provide the desired flow rate and to improve accuracy in the event of major disturbances active on said system.

13. The system according to claim 12, in which said synthetic lower limit flow rate signal is representative of the product of said lower limit flow rate multiplied by a predetermined constant C and said synthetic upper limit signal corresponds to said upper limit flow rate multiplied by a second predetermined constant D.

14. The system of claim 13, in which $C=D=1$.

15. The system according to claim 13, in which C and D are different.

16. The system according to any of claims 12-15, in which said controlling flow rate signal representative of said sensed flow rate signal corresponds to the product of said sensed flow rate signal and a predetermined constant E, where E is a number other than 1.

17. The system according to any of claims 12-15, in which $A1=A2$.

* * * * *

Disclaimer 4,762,252.—*Frank S. Hyer*, Duxbury; *Paul M. Kitner*, Pembroke, both of Mass. ADAPTATION TO MAJOR OR SPORADIC DISTURBANCE ERROR IN WEIGH FEEDING APPARATUS. Patent dated Aug. 9, 1988. Disclaimer filed Nov. 13, 1989, by the assignee, Hyer Industries, Inc.

Hereby enters this disclaimer to claims 10, 11, 12, 14, and 17 of said patent.
[ *Official Gazette January 30, 1990* ]